United States Patent
Haruna et al.

(10) Patent No.: US 9,441,091 B2
(45) Date of Patent: Sep. 13, 2016

(54) TRANSPARENTIZATION AGENT COMPOSITION CONTAINING SORBITOL COMPOUND AND METHOD FOR PRODUCING POLYPROPYLENE RESIN COMPOSITION USING THIS SORBITOL COMPOUND

(71) Applicant: ADEKA CORPORATION, Tokyo (JP)

(72) Inventors: Toru Haruna, Saitama (JP); Naoko Tanji, Saitama (JP); Daniel Yataro Martin, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 197 days.

(21) Appl. No.: 14/152,087

(22) Filed: Jan. 10, 2014

(65) Prior Publication Data

US 2014/0128520 A1 May 8, 2014

Related U.S. Application Data

(62) Division of application No. 13/575,136, filed as application No. PCT/JP2011/055357 on Mar. 8, 2011, now abandoned.

(30) Foreign Application Priority Data

Mar. 29, 2010 (JP) ................................ 2010-076182
Mar. 29, 2010 (JP) ................................ 2010-076183

(51) Int. Cl.
| | |
|---|---|
| C08K 5/1575 | (2006.01) |
| C08K 5/101 | (2006.01) |
| C08L 23/10 | (2006.01) |
| B29C 47/00 | (2006.01) |
| B29C 47/92 | (2006.01) |
| B29C 47/40 | (2006.01) |
| C08K 5/134 | (2006.01) |

(52) U.S. Cl.
CPC ......... *C08K 5/1575* (2013.01); *B29C 47/0004* (2013.01); *B29C 47/0011* (2013.01); *B29C 47/40* (2013.01); *B29C 47/92* (2013.01); *C08K 5/101* (2013.01); *C08L 23/10* (2013.01); *B29C 2947/922* (2013.01); *B29C 2947/92695* (2013.01); *B29C 2947/92704* (2013.01); *B29C 2947/92876* (2013.01); *B29C 2947/92895* (2013.01); *C08K 5/134* (2013.01); *C08K 2201/005* (2013.01)

(58) Field of Classification Search
CPC .............................. C08K 5/1575; C08K 5/101
USPC ........................................................ 524/108
See application file for complete search history.

(56) References Cited

U.S. PATENT DOCUMENTS

| | | | |
|---|---|---|---|
| 4,954,291 A | 9/1990 | Kobayashi et al. | |
| 5,015,684 A | 5/1991 | Kobayashi et al. | |
| 5,198,484 A | 3/1993 | Mannion | |
| 5,310,950 A | 5/1994 | Mannion | |
| 6,232,376 B1 * | 5/2001 | Tsukada ................. | C08K 5/103 428/418 |
| 6,245,843 B1 * | 6/2001 | Kobayashi ........... | C07D 493/04 524/109 |
| 6,417,254 B1 | 7/2002 | Kobayashi | |
| 8,470,915 B2 | 6/2013 | Li et al. | |
| 2010/0267870 A1 | 10/2010 | Li et al. | |
| 2013/0289176 A1 | 10/2013 | Li et al. | |

FOREIGN PATENT DOCUMENTS

| | | |
|---|---|---|
| JP | 02-206627 | 8/1990 |
| JP | 06-145431 | 5/1994 |
| JP | 08-199003 | 8/1996 |
| JP | 2003096246 | 4/2003 |
| JP | 2004-168800 | 6/2004 |
| JP | 2009-217588 | 11/2009 |
| JP | 2011-502200 | 1/2011 |
| JP | 2011-207992 | 10/2011 |
| WO | WO 98/33851 | 8/1998 |
| WO | WO 99/18108 | 4/1999 |
| WO | 0234827 | 5/2002 |
| WO | WO 03/093360 | 11/2003 |

OTHER PUBLICATIONS

International Search Report, PCT/JP2011/055357, May 31, 2011.

* cited by examiner

*Primary Examiner* — Ling Choi
*Assistant Examiner* — Ronald Grinsted
(74) *Attorney, Agent, or Firm* — Young & Thompson

(57) ABSTRACT

A transparentization agent composition is a mixture containing 100 parts by mass of a dibenzylidene sorbitol compound represented by a general formula (I) having a particle diameter such that $d_{97}$ is from 30 μm to 200 μm and 5 to 200 parts by mass of tetrakis[3(3,5-di-tert-butyl-4-hydroxyphenyl)propionyloxymethyl]methane, wherein the total for the two components is 50% by mass or more of the mixture. Also disclosed is a method for producing a polypropylene resin composition, including obtaining a polypropylene resin composition in which a dibenzylidene sorbitol compound represented by a general formula (I) having a particle diameter such that $d_{97}$ is from 30 μm to 200 μm is incorporated in a polypropylene resin, by kneading a mixture containing 100 parts by mass of the polypropylene resin and 0.05 to 2 parts by mass of the dibenzylidene sorbitol compound by using a biaxial extruder at an extrusion temperature of from 220 to 250° C.

6 Claims, No Drawings

TRANSPARENTIZATION AGENT COMPOSITION CONTAINING SORBITOL COMPOUND AND METHOD FOR PRODUCING POLYPROPYLENE RESIN COMPOSITION USING THIS SORBITOL COMPOUND

CROSS REFERENCE TO RELATED APPLICATIONS

This application is a division of application Ser. No. 13/575,136 filed on Jul. 25, 2012, which is a National Stage of PCT/2011/055357 filed on Mar. 8, 2011, which claims foreign priority to Japanese Application Nos. 2010-076183 and 2010-076182 filed on Mar. 29, 2010. The entire contents of each of the above applications are hereby incorporated by reference.

TECHNICAL FIELD

The present invention relates to a transparentization agent composition that can form a polypropylene resin composition that is excellent in transparency, by mixing a dibenzylidene sorbitol transparentization agent having a large particle diameter which has been conventionally considered to be not suitable for adding during processing of a polypropylene resin, with a specific phenol antioxidant in advance, prior to mixing with a resin, and adding the mixture to the resin.

Furthermore, the present invention also relates to a method for the production of a polypropylene resin composition that is excellent in transparency, which has enabled incorporation of a dibenzylidene sorbitol transparentization agent having a large particle diameter which has been conventionally considered to be not suitable for adding during processing of a polypropylene resin, by selecting a specific condition for processing.

BACKGROUND ART

Polypropylene resins such as propylene homopolymers and ethylene-propylene copolymers are widely used in automobiles, household appliances, construction materials, furniture, packing containers, toys, miscellaneous daily goods and the like. However, since polypropylene resins are inferior to polyethylenes, polyethylene telephthalates, polycarbonates, polystyrenes and the like in transparency, incorporation of various nucleating agents and transparentization agents such as metal salts of benzoic acid, metal salts of aromatic phosphate esters, metal salts of alicyclic compounds, dibenzylidene sorbitols, and amide compounds has been suggested since before and put into practical use.

Among these, dibenzylidene sorbitols are excellent in an effect of improving transparency, but they have defects that they have strong odor, they have a high melting point and thus are difficult to be dispersed homogeneously in resins at a processing temperature, and the like. Although homogeneous dispersion is possible by adjusting the processing temperature to the melting point or more, processing at the melting point or more is not preferable for a compound represented by the general formula (I) which is used in the present invention since it has a high melting point of 260° C. or more and thus processing at the melting point or more causes significant deterioration of polypropylene. In order to improve dispersibility in resins at the melting point or less, various treatments such as decreasing of the particle diameter by pulverization and decreasing of the melting point by melt-mixing with other component in advance have been suggested.

For example, Patent Literature 1 suggests expressing performances by forming a dibenzylidene sorbitol into a powder having $d_{97}$ of 30 μm or less. Although this dibenzylidene sorbitol is excellent in an effect of improving transparency, it has problems that the flowability is decreased by forming into a micropowder, thereby handling properties such as measuring and charging are decreased, and that expected dispersibility cannot be obtained due to blocking, and the like. Furthermore, it is actually necessary to prevent secondary aggregation of the micropulverized product by using an inorganic substance, a surface treating agent or the like, and thus the production cost is increased and components that are unnecessary for the resin are mixed. Since mixing of unnecessary components is associated with unintended change in the physical properties of the resin and leads to decrease in the quality during recycling and limitation to the usage, micropulverization is not necessarily a satisfying solution means.

Patent Literature 2 suggests improving performances by using a mixture of dibenzylidene sorbitol compounds having different structures. Since melting point depression occurs by forming a mixture of substances having analogous structures, dispersibility in resins is improved. However, since a transparentization agent having other structure is daringly added to a compound that is specifically excellent in effects among dibenzylidene sorbitols, it is not a sufficient countermeasure due to that the transparentization effect is decreased, and the like.

Furthermore, since polypropylene alone is deteriorated at the processing temperature, it is essential to incorporate additive components such as phenol antioxidants and phosphorus antioxidants, and these additive components have been conventionally incorporated in powders or pellets of polypropylene together with a nucleating agent, a transparentization agent and the like. As is described in Patent Literature 1 as Comparative Examples, even these other additive components are incorporated in a resin together with a dibenzylidene sorbitol and mixed by a Henschel mixer or the like, the dispersibility of the dibenzylidene sorbitol could not be improved.

CITATION LIST

Patent Literatures

Patent Literature 1: JP 06-145431 A
Patent Literature 2: JP 02-206627 A

SUMMARY OF INVENTION

Technical Problem

The object of the present invention is to provide a dibenzylidene sorbitol-based transparentization agent that can form a polypropylene resin composition that is excellent in transparency, by incorporating a dibenzylidene sorbitol compound in a polypropylene resin without micropowderization.

Furthermore, the object of the present invention is to provide a method for the production of a polypropylene resin composition having excellent transparency and physical property despite that the dibenzylidene sorbitol compound has been incorporated in a polypropylene resin without micropowderization.

Solution to Problem

The present invention has achieved the above-mentioned objects by providing a transparentization agent composition, which is a mixture containing 100 parts by mass of a dibenzylidene sorbitol compound represented by the following general formula (I) having a particle diameter such that $d_{97}$ is from 30 μm to 200 μm and 5 to 200 parts by mass of tetrakis[3(3,5-di-tert-butyl-4-hydroxyphenyl)propionyloxymethyl]methane, wherein the total for the two components is 50% by mass or more of the mixture.

Furthermore, the present invention has achieved the above-mentioned objects by providing a method for producing a polypropylene resin composition, including obtaining a polypropylene resin composition in which a dibenzylidene sorbitol compound represented by the following general formula (I) having a particle diameter such that $d_{97}$ is from 30 μm to 200 μm is incorporated in a polypropylene resin, by kneading a mixture containing 100 parts by mass of the polypropylene resin and 0.05 to 2 parts by mass of the dibenzylidene sorbitol compound by using a biaxial extruder at an extrusion temperature of from 220 to 250° C.

[Chem. 1]

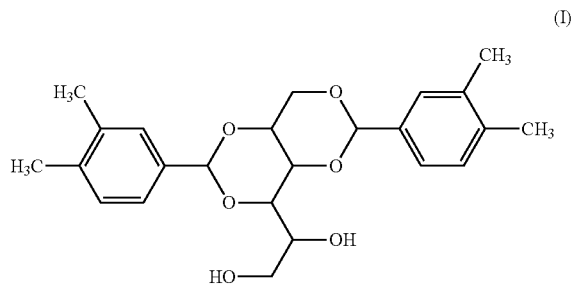

(I)

DESCRIPTION OF EMBODIMENTS

Firstly, the transparentization agent composition of the present invention will be explained. The dibenzylidene sorbitol compound represented by the general formula (I) which is used for the transparentization agent composition of the present invention is not specifically limited by the production method thereof, and any known method may be used.

The dibenzylidene sorbitol compound represented by the general formula (I) used for the transparentization agent composition of the present invention has a particle diameter such that $d_{97}$ is from 30 μm to 200 μm, preferably $d_{97}$ is from 40 μm to 150 μm, specifically preferably $d_{97}$ is from 40 μm to 100 μm. It is not preferable to pulverize so that $d_{97}$ becomes lower than 30 μm since the cost for pulverization is increased, blocking is generated to decrease handling properties, and dispersibility in a resin is also decreased. When $d_{97}$ is larger than 200 μm, there are problems that the transparency is insufficient, fish eyes are increased in the case of molding into a film or the like, and the like. Meanwhile, $d_{97}$ in the present invention is a particle diameter at which the percentage of the amount of particles that are smaller than a certain particle diameter with respect to the total amount of the particles is 97.

The tetrakis[3(3,5-di-tert-butyl-4-hydroxyphenyl)propionyloxymethyl]methane used in the transparentization agent composition of the present invention, including the intermediates thereof, can be used without limitation of the production method, crystal form, melting point, infrared ray absorption spectrum, X-ray diffraction peak and the like.

The transparentization agent composition of the present invention is obtained by mixing 5 to 200 parts by mass, preferably 10 to 150 parts by mass of tetrakis[3(3,5-di-tert-butyl-4-hydroxyphenyl)propionyloxymethyl]methane with 100 parts by mass of the dibenzylidene sorbitol compound represented by the general formula (I), The mixing conditions such as a mixing apparatus and a temperature are not specifically limited and various mixing apparatuses such as a Henschel mixer can be used. Since it is not specifically necessary to melt, it is preferable to mix at a room temperature without conducting treatments that lead to increase in costs such as heating and cooling. Furthermore, mixing at a room temperature is preferable since coloring during mixing is not concerned. In addition, the mixing treatment may be conducted under a nitrogen atmosphere so as to suppress coloring due to oxidation during heating and kneading with the resin.

In the transparentization agent composition of the present invention, the total amount of the both components: the dibenzylidene sorbitol compound represented by the general formula (I) and tetrakis[3(3,5-di-tert-butyl-4-hydroxyphenyl)propionyloxymethyl]methane is 50% by mass or more, preferably 80% by mass or more, specifically preferably 100% by mass of the mixture.

Examples of the component other than the above-mentioned both components which may be incorporated in the transparentization agent composition of the present invention may include antioxidants, hindered amine compounds, other nucleating agents and the like.

The transparentization agent composition of the present invention is effective for improving the transparency of the polypropylene resin, and examples of the polypropylene resin may include a propylene homopolymer, an ethylene-propylene random copolymer, an ethylene-propylene block copolymer, copolymers of propylene and a small amount (1 to 10% by mass) of other α-olefin (for example, 1-butene, 1-hexene, 4-methyl-1-pentene and the like), a copolymer of propylene and ethylenepropylene (TPO), and the like.

The above-mentioned polypropylene resins can be used irrespective of the kinds and presence or absence of a polymerization catalyst and a co-catalyst, stereoregularity, average molecular weight, molecular weight distribution, the presence or absence and ratio of a component having a specific molecular weight, specific gravity, viscosity, solubility in various solvents, stretch rate, impact strength, crystallinity, X-ray diffraction, unsaturated carboxylic acids (maleic acid, itaconic acid, fumaric acid and the like) and derivatives thereof (maleic anhydride, maleic acid monoesters, maleic acid diesters and the like) and organic peroxides, irradiation of energy ray, and the presence or absence of modification or a crosslinking treatment by a combination of these treatments, and the like.

The transparentization agent composition of the present invention is incorporated by preferably 0.01 to 10 parts by mass, more preferably by 0.05 to 5 parts by mass, with respect to 100 parts by mass of the polypropylene resin.

It is preferable to add general-purpose additives such as phenol antioxidants, phosphorus antioxidants, sulfur antioxidants, ultraviolet absorbers, hindered amine compounds, flame retarders, flame retardant aids, other nucleating agents, antistatic agents, heavy metal inactivators, plasticizers, softeners, lubricants, hydrotalcite compounds, aliphatic acid metal salts, pigments, infrared ray absorbers, antifogging agents, antimist agents, fillers, antibacterial agents and antifungal agents to the polypropylene resin composition containing the transparentization agent composition of the present invention, according to the condition for use and required property.

Examples of the phenol antioxidants may include 2,6-di-tert-butyl-p-cresol, 2,6-diphenyl-4-octadecyloxyphenol, 2-methyl-4,6-bis(octylthiomethyl)phenol, distearyl(3,5-di-tert-butyl-4-hydroxybenzyl)phosphonate, 1,6-hexamethylenebis[(3,5-di-tert-butyl-4-hydroxyphenyl)propionic acid amide], 4,4'-thiobis(6-tert-butyl-m-cresol), 2,2'-methylenebis(4-methyl-6-tert-butylphenol), 2,2'-methylenebis(4-ethyl-6-tert-butylphenol), 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl(3,5-di-tert-butyl-4-hydroxyphenyl)propionate, thiodiethyleneglycolbis[(3,5-di-tert-butyl-4-hydroxyphenyl)propionate], 1,6-hexamethylenebis[(3,5-di-tert-butyl-4-hydroxyphenyl) propionate], bis[3,3-bis(4-hydroxy-3-tert-butylphenyl) butyric acid]glycol ester, bis[2-tert-butyl-4-methyl-6-(2-hydroxy-3-tert-butyl-5-methylbenzyl)phenyl]telephthalate, 1,3,5-tris[(3,5-di-tert-butyl-4-hydroxyphenyl)propionyloxyethyl]isocyanurate, tetrakis[3-(3,5-di-tert-butyl-4-hydroxyphenyl)propionic acid methyl]methane, 3,9-bis[1,1-dimethyl-2-{(3-tert-butyl-4-hydroxy-5-methylphenyl) propionyloxy}ethyl]-2,4,8,10-tetraoxaspiro[5.5]undecane, triethyleneglycol bis[(3-tert-butyl-4-hydroxy-5-methylphenyl)propionate] and the like. The phenol antioxidants are used by preferably 0.001 to 10 parts by weight, more preferably by 0.05 to 5 parts by weight with respect to 100 parts by weight of the resin.

Examples of the phosphorus antioxidant may include trisnonyl phenyl phosphite, tris(2,4-di-tert-butylphenyl) phosphite, tris[2-tert-butyl-4-(3-tert-butyl-4-hydroxy-5-methylphenylthio)-5-methylphenyl]phosphite, tridecyl phosphite, octyl diphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tritert-butylphenyl)pentaerythritol diphosphite, bis(2,4-dicumylphenyl)pentaerythritol diphosphite, tetra(tridecyl) isopropylidenediphenol diphosphite, tetra(tridecyl)-4,4'-n-butylidenebis(2-tert-butyl-5-methylphenol)diphosphite, hexa(tridecyl)-1,1,3-tris(2-methyl-4-hydroxy-5-tert-butylphenyl)butanetriphosphite, tetrakis(2,4-di-tert-butylphenyl) biphenylenediphosphonite, 9,10-dihydro-9-oxa-10-phosphaphenanthrene-10-oxide, 2,2'-methylenebis(4,6-tert-butylphenyl)-2-ethylhexyl phosphite, 2,2'-methylenebis(4,6-tert-butylphenyl)-octadecyl phosphite, 2,2'-ethylidenebis(4,6-di-tert-butylphenyl)fluorophosphite, tris(2-[(2,4,8,10-tetrakis-tert-butyldibenzo[d,f][1,3,2]dioxaphosphepin-6-yl) oxy]ethyl)amine, phosphites of 2-ethyl-2-butylpropylene glycol and 2,4,6-tritert-butylphenol, and the like.

Examples of the sulfur antioxidants may include dilauryl thiodipropionate, dimyristyl thiodipropionate, dipalmityl thiodipropionate, distearyl thiodipropionate, tetrakis(3-laurylthiodipropionate)methane, bis(2-methyl-4-(alkyl($C_8$ to $C_{18}$, alone or mixture)thiopropionyloxy)-5-tert-butylphenyl) sulfide, 2-mercaptobenzimidazole and zinc salts thereof, and the like.

Examples of the ultraviolet absorbers may include 2-hydroxybenzophenones such as 2,4-dihydroxybenzophenone, 2-hydroxy-4-methoxybenzophenone, 2-hydroxy-4-octoxybenzophenone and 5,5'-methylenebis(2-hydroxy-4-methoxybenzophenone); 2-(2'-hydroxyphenyl)benzotriazoles such as 2-(2'-hydroxy-5'-methylphenyl)benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2,2'-methylenebis(4-tert-octyl-6-benzotriazolyl)phenol and 2-(2'-hydroxy-3'-tert-butyl-5'-carboxyphenyl)benzotriazole; benzoates such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate and hexadecyl-3,5-di-tert-butyl-4-hydroxybenzoate; substituted oxanilides such as 2-ethyl-2'-ethoxyoxanilide and 2-ethoxy-4'-dodecyloxanilide; cyanoacrylates such as ethyl-$\alpha$-cyano-$\beta\beta$-diphenylacrylate and methyl-2-cyano-3-methyl-3-(p-methoxyphenyl) acrylate; and triaryltriazines such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine and 2-(2-hydroxy-4-propoxy-5-methylphenyl)-4,6-bis(2,4-di-tert-butylphenyl)-s-triazine.

Examples of the hindered amine compounds may include hindered amine compounds such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl) sebacate, bis(1,2,2,6,6-pentamethyl-4-piperidyl) sebacate, bis(1-undecyloxy-2,2,6,6-tetramethyl-4-piperidyl)carbonate, tetrakis(2,2,6,6-tetramethyl-4-piperidylbutanetetracarboxylate, tetrakis(1,2,2,6,6-pentamethyl-4-piperidylbutanetetracarboxylate, bis(2,2,6,6-tetramethyl-4-piperidyl)-di(tridecyl)-1,2,3,4-butanetetracarboxylate, bis(1,2,2,6,6-pentamethyl-4-piperidyl)-di(tridecyl)-1,2,3,4-butanetetracarboxylate, bis(1,2,2,6,6-pentamethyl-4-piperidyl)-2-butyl-2-(3,5-di-tert-butyl-4-hydroxybenzyl) malonate, a polycondensate of 1-(2-hydroxyethyl)-2,2,6,6-tetramethyl-4-piperidinol/diethyl succinate, a polycondensate of 1,6-bis(2,2,6,6-tetramethyl-4-piperidylamino)hexane/dibromoethane, a polycondensate of 1,6-bis(2,2,6,6-tetramethyl-4-piperidylamino)hexane/2,4-dichloro-6-morpholino-s-triazine, a polycondensate of 1,6-bis(2,2,6,6-tetramethyl-4-piperidylamino)hexane/2,4-dichloro-6-tert-octylamino-s-triazine, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl) amino)-s-triazin-6-yl]-1-1,5,8,12-tetraazadodecane, 1,6,11-tris[2,4-bis(N-butyl-N-(2,2,6,6-tetramethyl-4-piperidyl) amino)-s-triazin-6-ylaminoun decane and 1,6,11-tris[2,4-bis (N-butyl-N-(1,2,2,6,6-pentamethyl-4-piperidyl)amino)-s-triazin-6-ylamino undecane.

As the flame retarders, halogen flame retarders such as decabromodiphenyl ether and tetrabromobisphenol A, condensed phosphoric acid esters of a polyvalent phenol such as triphenyl phosphate, resorcinol and bisphenol A and a monovalent phenol such as 2,6-xylenol; inorganic phosphorus compounds such as red phosphorus and melamine phosphate; nitrogen-containing flame retarders such as melamine cyanurate; inorganic flame retarders such as magnesium hydroxide and aluminum hydroxide; flame retardant aids such as antimony oxide and zirconium oxide; antidrip agents such as polytetrafluoroethylene, and the like are used.

Examples of the flame retardant aid may include fluorine resins such as polytetrafluoroethylene (PTFE), polyvinylidene fluoride (PVDF), polyvinyl fluoride (PVF), polytetrafluoroethylene-hexafluoropropylene copolymer (FEP) and (meth)acrylic-modified PTFE, silicone resins and the like.

Examples of the other nucleating agents may include metal salts of benzoic acids such as sodium benzoate, aluminum-p-tert-butyl benzoate and lithium-p-tert-butyl benzoate; phosphoric acid ester metal salts such as sodium 2,2-methylenebis(4,6-di-tert-butylphenyl)phosphoric acid ester; other benzylidene sorbitols such as dibenzylidene sorbitol, bis(4-methylbenzylidene)sorbitol and bis(4-ethylbenzylidene)sorbitol; metal alcoholates such as zinc glycerin; amino acid metal salts such as zinc glutamate; aliphatic dibasic acids having a bicyclo structure and metal salts thereof such as bicycloheptane dicarboxylic acid or salts thereof, aromatic sulfonic acid metal salts such as sodium benzenesulfonate and lithium p-toluenesulfonate, and the like.

In the present invention, even if the dibenzylidene sorbitol compound of the general formula (I) that is specifically excellent in transparency is used without micropulverization, a similar effect to that of a micropulverized article can be obtained, and combination use of other dibenzylidene sorbitol decreases the effect of the present invention since the effect of improving transparency is decreased as compared to the addition amount. Combination use with a nucleating agent that improves not only transparency but also the glass transition temperature of the polypropylene resin, like a metal salt compound such as a phosphoric acid ester metal salt such as sodium 2,2-methylenebis(4,6-di-tert-butylphenyl)phosphoric acid ester, is preferable since an effect that cannot be obtained by only the present invention can be expected.

Examples of the heavy metal inactivators may include 2-hydroxybenzamide-N-1H-1,2,4-triazol-3-yl and dodecanedioic acid bis[2-(2-hydroxybenzoyl)hydrazide].

As the hydrotalcite compound, a double salt compound containing magnesium and aluminum or double salt compound containing magnesium, zinc and aluminum represented by the following formula (II) is preferably used, or the double salt compound may be dehydrated to remove crystalline water.

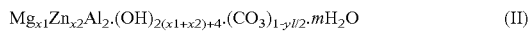
$$Mg_{x1}Zn_{x2}Al_2 \cdot (OH)_{2(x1+x2)+4} \cdot (CO_3)_{1-y1/2} \cdot mH_2O \qquad (II)$$

wherein x1, x2 and y1 each represents a number that satisfies the condition represented by the following formula, and m represents 0 or an optional integer:

$$0 \leq x2/x1 \leq 10,\ 2x1+x2 < 20,\ 0 \leq y1 \leq 2$$

The above-mentioned hydrotalcite compound may be a natural substance or a synthesized product. As the method for the synthesis of the synthesized product, known synthesis methods described in Japanese Patent Application Publication (JP-B) Nos. 46-2280, 50-30039, 51-29129, 3-36839, JP-A Nos. 61-174270, 2001-164042, 2002-53722 and the like can be exemplified. Furthermore, the above-mentioned hydrotalcite compound can be used in the present invention without limitation by its crystalline structure, crystalline particle diameter and the like, and it is preferable that the residual amount of a heavy metal component such as iron included in the raw material is small such that the cost for purification is in a practical range.

Alternatively, as the above-mentioned hydrotalcite compound, those coating the surface thereof with a higher aliphatic acid such as stearic acid, a higher aliphatic acid metal salt such as an alkali metal oleate, an organic sulfonic acid metal salt such as an alkali metal salt of dodecylbenzenesulfonic acid, a higher aliphatic acid amide, a higher aliphatic acid ester or a wax, or the like can also be used.

The method for incorporating the transparentization agent composition of the present invention in the polypropylene resin and the method for molding, use and the like of the resin composition after the incorporation are not specifically limited. The resin composition is molded into a film, a sheet, a molded product or the like by using a known molding and processing technique such as extrusion molding, injection molding, blow, calendar, press molding and vacuum molding, and is used for interior and exterior materials for automobiles, household appliance products, construction materials, packaging materials, agriculture materials, miscellaneous goods, medical instruments and the like. As the form for use, the resin composition can be used alone, or after adhering to other resin, metal or the like directly or through an adhesive layer.

Next, the method for producing polypropylene resin composition of the present invention will be explained. Examples of the polypropylene resin that is used for the method for producing the polypropylene resin composition of the present invention may include a propylene homopolymer, an ethylene-propylene random copolymer, an ethylene-propylene block copolymer, copolymers of propylene and a small amount (1 to 10% by mass) of other α-olefin (for example, 1-butene, 1-hexene, 4-methyl-1-pentene and the like), a copolymer of propylene and ethylenepropylene (TPO) and the like.

The above-mentioned polypropylene resins can be used irrespective of the kinds and presence or absence of a polymerization catalyst and a co-catalyst, stereoregularity, average molecular weight, molecular weight distribution, the presence or absence and ratio of a component having a specific molecular weight, specific gravity, viscosity, solubility in various solvents, stretch rate, impact strength, crystallinity, X-ray diffraction, unsaturated carboxylic acids (maleic acid, itaconic acid, fumaric acid and the like) and derivatives thereof (maleic anhydride, maleic acid monoesters, maleic acid diesters and the like) and organic peroxides, irradiation of energy ray, and the presence or absence of modification or a crosslinking treatment by a combination of these treatments, and the like.

The dibenzylidene sorbitol compound represented by the general formula (I) which is used for the method for producing the polypropylene resin compound of the present invention is not specifically limited by the production method thereof, and any known method may be used.

The dibenzylidene sorbitol compound represented by the general formula (I) used for the production method of the present invention has a particle diameter such that $d_{97}$ is from 30 μm to 200 μm, specifically preferably $d_{97}$ is from 40 μm to 150 μm. It is not preferable to pulverize so that $d_{97}$ becomes lower than 30 μm since the cost for pulverization is increased, blocking is generated to decrease handling properties. When $d_{97}$ is larger than 200 μm, there are problems that the transparency is insufficient, fish eyes are increased in the case when the resin is formed into a film or the like, and the like. Meanwhile, $d_{97}$ in the present invention is a particle diameter at which the percentage of the amount of particles that are smaller than a certain particle diameter with respect to the total amount of the particles is 97.

The incorporation amount of the above-mentioned dibenzylidene sorbitol compound represented by the general formula (I) is 0.05 to 2 parts by mass, preferably 0.1 to 1 part by mass with respect to 100 parts by mass of the above-mentioned polypropylene resin. When the incorporation amount of the dibenzylidene sorbitol compound is lower than 0.05 part by mass, the effect of addition is insufficient, and even if it is added by exceeding 2 parts by mass, no improvement of the effect is observed.

The biaxial extruder for kneading the mixture obtained by incorporating the above-mentioned dibenzylidene sorbitol compound represented by the general formula (I) in the above-mentioned polypropylene resin, a biaxial extruder having at least three temperature-controlled areas from a resin injection part to dies is preferable, and for example, a biaxial extruder PCM-30 (trade name) manufactured by Ikegai Corporation, a biaxial extruder TEX-28V (trade name) manufactured by Japan Steel Works, Ltd. or the like can be preferably used.

The kneading of the mixture by the above-mentioned biaxial extruder is conducted at an extrusion temperature of 220 to 250° C., preferably 230 to 250° C. The temperature of the biaxial extruder may be set so that the temperatures of the parts other than the resin injection part and other than the dies are each set to 220 to 250° C. in the areas from the resin injection part to the dies in the biaxial extruder.

When the extrusion temperature is lower than 220° C., dispersibility is poor and thus the effect is difficult to be exerted, and when the temperature exceeds 250° C., it is not preferable since deterioration of the polypropylene resin is caused.

In incorporating the above-mentioned dibenzylidene sorbitol compound represented by the general formula (I) in the above-mentioned polypropylene resin, it is preferable to incorporate the dibenzylidene sorbitol compound and tetrakis[3(3,5-di-tert-butyl-4-hydroxyphenyl)propionyloxymethyl]methane in the form of a mixture, or to incorporate those compounds separately at the same time. In the case when tetrakis[3(3,5-di-tert-butyl-4-hydroxyphenyl)propionyloxymethyl]methane is incorporated, it is preferably incorporated by 5 to 200 parts by mass, specifically by 10 to 150 parts by mass with respect to 100 parts by mass of the above-mentioned dibenzylidene sorbitol compound.

Furthermore, it is preferable to add general-purpose additives such as phenol antioxidants, phosphorus antioxidants, sulfur antioxidants, ultraviolet absorbers, hindered amine compounds, flame retarders, flame retardant aids, other nucleating agents, antistatic agents, heavy metal inactivators, plasticizers, softeners, lubricants, hydrotalcite compounds, aliphatic acid metal salts, pigments, infrared ray absorbers, antifogging agents, antimist agents, fillers, antibacterial agents and antifungal agents to the mixture in which the above-mentioned dibenzylidene sorbitol compound represented by the general formula (I) is incorporated in the above-mentioned polypropylene resin, according to the condition for use and required property. As the specific examples of these resin additives, those mentioned above can be used.

The method for molding, use and the like of the polypropylene resin composition according to the present invention are not specifically limited. The composition is molded into a film, a sheet, a molded product or the like by using a known molding and processing technique such as extrusion molding, injection molding, blow, calendar, press molding and vacuum molding, and is used for interior and exterior materials for automobiles, household appliance products, construction materials, packaging materials, agriculture materials, miscellaneous goods, medical instruments and the like. As the form for use, the composition can be used alone, or after adhering to other resin, metal or the like directly or through an adhesive layer.

EXAMPLES

Synthesis Example

Synthesis of the Dibenzylidene Sorbitol Compound Represented By the General Formula (I)

To a four-necked reaction flask are added 44 g (0.42 mol) of 3,4-dimethylbenzaldehyde, 38 g (0.21 mol) of sorbitol, 5 g of 50% sulfuric acid as a catalyst, 700 ml of cyclohexane as a solvent and 70 ml of methanol, and stirring is conducted at the reflux temperature of methanol. Methanol of a similar amount to the amount of the volatilized methanol is added dropwise as needed, and a massive substance is obtained by a reaction for 5 hours.

The obtained massive substance is washed with isopropyl alcohol/water=1/1 (volume ratio), and the filtered substance is dried at 90° C. under a reduced pressure.

The obtained mass was pulverized by a pulverizer to give each dibenzylidene sorbitol powder (it is abbreviated as Sorbitol in Table 1 and Table 2) having d97 described in Table 1 and Table 2. The $d_{97}$ of the dibenzylidene sorbitol powder was measured by laser light scattering. Furthermore, blocking property was evaluated for the obtained dibenzylidene sorbitol powders by measuring angles of repose by a powder tester. The angles of repose of the respective dibenzylidene sorbitol powders are shown in Table 1 and Table 2. A larger angle of repose represents poorer flowability.

Examples 1 to 5 and Comparative Examples 1 to 3

Each transparentization agent composition was prepared by mixing each of the dibenzylidene sorbitol powders obtained in Synthesis Example (these are abbreviated as Sorbitols in Table 1) and a powder of tetrakis[3-(3,5-di-tert-butyl-4-hydroxyphenyl)propionyloxymethyl]methane (this is abbreviated as Phenol in Table 1: ADEKA STAB AO-60 manufactured by ADEKA Corporation was used) by the composition described in Table 1.

These transparentization agent compositions were each incorporated in a polypropylene resin as follows to give a test piece. In Comparative Example 3, the dibenzylidene sorbitol powder and the powder of tetrakis[3-(3,5-di-tert-butyl-4-hydroxyphenyl)propionyloxymethyl]methane were incorporated directly in a polypropylene resin together with other resin additives, without preparing a transparentization agent composition.

To 100 parts by mass of a random polypropylene (MFI=8 to 10 g/10 minutes: MG3: manufactured by Japan Polypropylene Corporation) were incorporated 0.1 part by mass of tetrakis[3-(3,5-di-tert-butyl-4-hydroxyphenyl)propionyloxymethyl]methane, 0.05 part by mass of tris(2,4-di-tert-butylphenyl)phosphite, 0.05 part by mass of calcium stearate and 0.3 part by mass of the transparentization agent composition described in Table 1, and the mixture was mixed by a Henschel mixer and extrusion-molded by a biaxial extruder (PCM-30 manufactured by Ikegai Corporation) to give pellets. The obtained pellets were injection-molded at 250° C. to prepare a test piece having a thickness of 1 mm.

The melt flow index (MFI) at 230° C. under a load of 2.16 kg of the obtained pellets was measured according to JIS K 7210 by using a melt indexer (manufactured by Toyo Seiki Seisaku-Sho, Ltd.) to evaluate the presence or absence of decrease in the physical properties of the resin. A larger MFI is not preferable since the physical properties of the resin are changed more significantly. Furthermore, the haze of the test piece was measured according to JIS K 7361-1 to evaluate the effect of improving transparency. A smaller value of haze is preferable since transparency is more excellent. These results are shown in Table 1.

TABLE 1

|  | Examples | | | | | Comparative Examples | | |
| --- | --- | --- | --- | --- | --- | --- | --- | --- |
|  | 1 | 2 | 3 | 4 | 5 | 1 | 2 | 3 |
| $d_{97}$(μm) | 47 | 47 | 47 | 31 | 144 | 12 | 47 | 47 |
| Angle of repose(°) | 33 | 33 | 33 | 35 | 31 | 44 | 33 | 33 |
| Incorporation of transparentization agent composition | | | | | | | | |
| Sorbitol (parts by mass) | 100 | 100 | 100 | 100 | 100 | 100 | 100 | 100 |
| Phenol (parts by mass) | 100 | 50 | 30 | 100 | 100 | 100 | 0 | 100 |
| Haze | 9 | 8 | 8 | 9 | 9 | 9 | 11 | 13 |
| MFI (g/10 min) | 20 | 23 | 21 | 21 | 20 | 24 | 33 | 20 |

The following matters are obvious from the results shown in Table 1. The polypropylene resins of Examples 1 to 5 to which the transparentization agent composition of the present invention has been incorporated are excellent in transparency and the physical properties have not been decreased. On the other hand, the polypropylene resin of Comparative Example 1 to which a transparentization agent composition using a dibenzylidene sorbitol powder having a particle diameter so that $d_{97}$ is smaller is incorporated is excellent in transparency but the physical properties have been decreased. Furthermore, the polypropylene resin of Comparative Example 2 to which a transparentization agent composition composed of a dibenzylidene sorbitol powder alone has been added has poor transparency and significantly decreased physical properties. In addition, the polypropylene resin of Comparative Example 3 to which the dibenzylidene sorbitol powder and the powder of tetrakis [3-(3,5-di-tert-butyl-4-hydroxyphenyl)propionyloxymethyl] methane have been incorporated directly has significantly poor transparency as a result.

Examples 6 to 8 and Comparative Examples 4 to 8

To 100 parts by mass of a random polypropylene (MFI=8 to 10 g/10 minutes: MG3: manufactured by Japan Polypropylene Corporation) were incorporated 0.1 part by mass of tetrakis[3-(3,5-di-tert-butyl-4-hydroxyphenyl)propionyloxymethyl]methane, 0.05 part by mass of tris(2,4-di-tert-butylphenyl)phosphite, 0.05 part by mass of calcium stearate and 0.2 part by mass of the dibenzylidene sorbitol powder having $d_{97}$ described in Table 2 which was obtained in Synthesis Example, and the mixture was mixed by a Henschel mixer and extrusion-molded by using the extruder described in Table 2 at the extrusion temperature described in Table 2 to give pellets. The obtained pellets were injection-molded at 250° C. to prepare a test piece having a thickness of 1 mm.

The melt flow index (MFI) at 230° C. under a load of 2.16 kg of the obtained pellets was measured according to JIS K 7210 by using a melt indexer (manufactured by Toyo Seiki Seisaku-Sho, Ltd.) to evaluate the presence or absence of decrease in the physical properties of the resin. A larger MFI is not preferable since the physical properties of the resin are changed more significantly. Furthermore, the haze of the test piece was measured according to JIS K 7361-1 to evaluate the effect of improving transparency. A smaller value of haze is preferable since transparency is more excellent. These results are shown in Table 2.

TABLE 2

|  | Examples | | | Comparative Examples | | | | |
| --- | --- | --- | --- | --- | --- | --- | --- | --- |
|  | 6 | 7 | 8 | 4 | 5 | 6 | 7 | 8 |
| $d_{97}$(μm) | 36 | 47 | 102 | 17 | 36 | 293 | 47 | 47 |
| Angle of repose(°) | 34 | 33 | 32 | 42 | 34 | 30 | 33 | 33 |
| Extruder*1 | Biaxial | Biaxial | Biaxial | Biaxial | Monoaxial | Biaxial | Biaxial | Monoaxial |
| Extrusion temperature (° C.) | 230 | 250 | 240 | 240 | 230 | 250 | 280 | 280 |
| Haze | 8 | 8 | 8 | 8 | 11 | 13 | 15 | 15 |
| MFI (g/10 min) | 20 | 23 | 21 | 21 | 20 | 23 | 33 | 30 |

*1As the biaxial extruder, PCM-30 manufactured by Ikegai Corporation was used.
As the monoaxial extruder, OEX3024 manufactured by DDM Co., Ltd. was used.

The following matters are obvious from the results shown in Table 2. It is obvious from the comparison of Example 6 and Comparative Example 5 that the effect of improving transparency is small in the monoaxial extruder even in the same composition, and thus the effect of the present invention is exerted by only using the biaxial extruder. Furthermore, it is obvious from Comparative Examples 7 and 8 that unpreferable results were obtained in transparency and stability of physical properties even if improvement of dispersibility is intended by raising the processing temperature, and the effect of the present invention is exerted by only selecting the temperature and processing machine. It is obvious from the comparison of Examples 6 and 8 and Comparative Example 4 that the dibenzylidene sorbitol compound having a large particle diameter which is excellent in flowability shows similar performances to those of a micropowdered product in transparency and stability of physical properties that were considered to be poor in the past, by using the processing conditions of the present invention. In addition, according to Comparative Example 6, in the case when the dibenzylidene sorbitol compound having $d_{97}$ of a value that is close to 300 μm is used, since the transparency is poor even under the processing conditions of the present invention, it is necessary to use the dibenzylidene sorbitol compound after adjusting $d_{97}$ to 200 μm or less.

INDUSTRIAL APPLICABILITY

The transparentization agent composition of the present invention can provide a transparentization agent composition by which a polypropylene resin composition that is excellent in transparency can be molded without micropulverization of a dibenzylidene sorbitol compound, by preparing a mixture of a dibenzylidene sorbitol compound having a large particle diameter by which sufficient transparency could not be obtained in the past, with a specific phenol antioxidant, and adding the mixture to a polypropylene resin.

Furthermore, the method for the production of the polypropylene resin composition of the present invention can give a polypropylene resin composition having excellent transparency and physical properties despite the fact that a dibenzylidene sorbitol compound has been incorporated in the polypropylene resin without micropowderization.

The invention claimed is:

1. A method of preparing a polypropylene resin composition having a transparentization agent composition incorporated into said polypropylene resin, said method comprising preparing a transparentization agent composition as a mixture comprising two components: 100 parts by mass of a dibenzylidene sorbitol compound represented by the following general formula (I):

[Chem. 1]

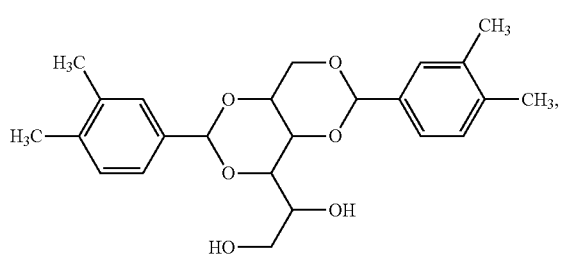

(I)

said compound having a particle diameter such that $d_{97}$ is from 30 μm to 200 μm, and 5 to 200 parts by mass of tetrakis[3(3,5-di-tert-butyl-4-hydroxyphenyl)propionyloxymethyl] methane, the two components being 50% by mass or more of the mixture forming the transparentization agent composition; and incorporating the transparentization agent composition into said polypropylene resin.

2. The method according to claim 1, wherein the dibenzylidene sorbitol compound represented by the general formula (I) has $d_{97}$ of from 40 μm to 100 μm.

3. The method for producing a polypropylene resin composition according to claim 1, further comprising kneading a mixture containing the polypropylene resin and the transparentization agent composition by using a biaxial extruder at an extrusion temperature of from 220 to 250° C.

4. The method for producing a polypropylene resin composition according to claim 3, wherein the biaxial extruder comprises at least three temperature-controlled areas from a resin injection part to dies, and the temperatures of the parts other than the resin injection part and other than the dies are each set to 220 to 250° C.

5. The method for producing a polypropylene resin composition according to claim 2, further comprising kneading a mixture containing the polypropylene resin and the transparentization agent composition by using a biaxial extruder at an extrusion temperature of from 220 to 250° C.

6. The method for producing a polypropylene resin composition according to claim 5, wherein the biaxial extruder comprises at least three temperature-controlled areas from a resin injection part to dies, and the temperatures of the parts other than the resin injection part and other than the dies are each set to 220 to 250° C.

* * * * *